US012668329B1

(12) United States Patent
Oliverio et al.

(10) Patent No.: US 12,668,329 B1
(45) Date of Patent: Jun. 30, 2026

(54) FLUID FLOW CONTROL SYSTEM

(71) Applicants: John D. Oliverio, Brandon, FL (US); Jared R. Sandifer, Zephyrhills, FL (US); Jantzen J.A. Maynard, Brooksville, FL (US); Edward J. Shynski, Tampa, FL (US)

(72) Inventors: John D. Oliverio, Brandon, FL (US); Jared R. Sandifer, Zephyrhills, FL (US); Jantzen J.A. Maynard, Brooksville, FL (US); Edward J. Shynski, Tampa, FL (US)

(73) Assignee: IL Marine Systems, Inc., Tampa, FL (US)

( * ) Notice: Subject to any disclaimer, the term of this patent is extended or adjusted under 35 U.S.C. 154(b) by 445 days.

(21) Appl. No.: 18/445,525

(22) Filed: Sep. 23, 2023

Related U.S. Application Data

(60) Provisional application No. 63/474,900, filed on Sep. 23, 2022.

(51) Int. Cl.

| | |
|---|---|
| ***B63B 21/26*** | (2006.01) |
| ***B63B 21/30*** | (2006.01) |
| ***F15B 15/18*** | (2006.01) |

(52) U.S. Cl.
CPC .............. *B63B 21/26* (2013.01); *B63B 21/30* (2013.01); *F15B 15/18* (2013.01)

(58) Field of Classification Search
CPC ......... B63B 21/00; B63B 21/26; B63B 21/30; F15B 15/00; F15B 15/18
USPC .......................................................... 114/294
See application file for complete search history.

(56) References Cited

U.S. PATENT DOCUMENTS 10,526,050 B1 * 1/2020 Turek ...................... B63B 21/26

* cited by examiner

*Primary Examiner* — Lars A Olson
(74) *Attorney, Agent, or Firm* — Arthur W. Fisher, III

(57) ABSTRACT

A fluid flow control system to control the movement of a work element such as a shallow water anchor between a first position and second position wherein the fluid flow control system includes an actuator assembly and pump assembly coupled together by a modular fluid distribution assembly that includes a first fluid flow path and a second fluid flow path to selectively move the work element between the first position and second position.

6 Claims, 8 Drawing Sheets

FLUID FLOW CONTROL SYSTEM

CROSS REFERENCE

This is a utility application of provisional application Ser. No. 63/474,900, filed Sep. 23, 2022.

BACKGROUND OF THE INVENTION

Field of the Invention

A fluid flow control system including a modular fluid distribution assembly including a first fluid flow path and a second fluid flow path to circulate fluid between a pump assembly and an actuator assembly that eliminates use of flexible hoses.

Description of the Prior Art

Shallow water anchors are used to anchor watercraft in relatively shallow water. These anchors have the advantages of being easy to manipulate, relatively quiet to operate and require relatively small power to stow and to deploy.

Such shallow water anchors may be transitioned from a stowed position to deployed position by a variety of methods. For example, an electric motor may drive the anchor between the stowed position and the deployed position. In another example, the anchor may be transitioned between the stowed position and the deployed position by a hydraulically actuated system.

U.S. Pat. No. 6,041,730 relates to a shallow water anchoring mechanism for a vessel drives an upper arm between a raised position, in which the lower end of a pole is above the bottom of the hull and a lowered position, in which the lower end of the pole extends downward below the vessel so as to engage the bottom of a shallow body of water. This provides a shallow-water anchoring arrangement for a boat that does a minimum amount of damage to sea life, including oysters, and grasses or other vegetation growing on the bottom of the water, and allows a boater to anchor in shallow water and to leave the anchorage without bringing mud, grasses, or other debris into the boat.

CA 3 055 513 describes a shallow water anchor including a four-bar linkage and a hydraulic actuator for actuating the four-bar linkage having an anchoring element attached thereto. A hydraulic control arrangement operates the hydraulic actuator to transition the hydraulic actuator between stowed and deployed positions.

U.S. Pat. No. 8,776,712 discloses a shallow water anchor comprising a first anchor extension and a second anchor extension axially received by a housing. The first anchor extension is axially received by the second anchor extension such that the first and second anchor extensions are sequentially deployable from the housing using an actuation arrangement. The actuation arrangement is controlled by a control interface that is operable to detect when the shallow water anchor has reached a fully extended state and fully retracted state.

While this prior art may contain some similarities relating to the present invention, none teach, suggest or include the advantages and unique features of the invention disclosed hereafter.

SUMMARY OF THE INVENTION

The present invention relates to a fluid flow control system to control the movement of a work element such as a shallow water anchor between a first position and second position. The fluid flow control system includes an actuator assembly and pump assembly coupled together by a modular fluid distribution assembly mounted axially at a load bearing pivot point and that includes a first fluid flow path and a second fluid flow path to selectively move the work element between the first position and second position.

The actuator assembly comprises an actuator extension subassembly and an actuator retraction subassembly. The actuator extension subassembly comprises an elongated cylinder having a piston and actuator rod combination disposed therein. The proximal end of the elongated cylinder is coupled to the modular fluid distribution assembly to facilitate the flow of fluid to and from the pump assembly through the first fluid flow path formed in the modular fluid distribution assembly to the proximal side of the piston.

The actuator retraction subassembly comprises a substantially straight conduit coupled between the distal end of the elongated cylinder and the modular fluid distribution assembly to facilitate flow of fluid to and from the pump assembly through the second fluid flow path formed in the modular fluid distribution assembly to the distal side of the piston.

The modular fluid distribution assembly comprises a distal manifold member coupled to the actuator assembly and an interior fluid transfer member disposed between a first fluid flow member and a second fluid flow member that are coupled to the pump assembly.

A first fluid passage and a second fluid passage are formed in the interior of the distal manifold member. The first fluid flow member includes a first flow passage formed therein; while, the second fluid flow member includes a second flow passage formed therein.

The interior fluid transfer member includes a first fluid flow groove and a second fluid flow groove that together with the first fluid flow member and the second fluid flow member form a first fluid flow channel and a second fluid flow channel respectively in fluid communications between the first fluid passage and the first flow passage, and the second fluid passage and the second flow passage respectively.

When the modular fluid flow control system is assembled the first fluid flow member and second fluid flow member are rotatably mounted or coupled to opposite sides of the distal manifold member and interior fluid transfer member to form the modular fluid distribution assembly.

The pump assembly comprises a reversible pump to pump fluid to and from the actuator assembly through the modular fluid distribution assembly.

In particular, when fully assembled the first fluid flow passage of the first fluid flow member, the first fluid flow channel in the interior fluid transfer member and the first fluid flow passage of the proximal manifold member cooperatively form the first fluid flow path to transfer fluid between the actuator extension subassembly of the actuator assembly and the pump assembly; while, the second fluid flow passage of the second fluid flow member, the second fluid flow channel in the interior transfer member and the second proximal fluid flow passage of the distal manifold member cooperatively form the second fluid flow path to transfer fluid between the actuator retraction subassembly of the actuator assembly and the pump assembly.

This Summary is not intended to describe essential features of the claimed subject matter nor is it intended to limit the scope of the claimed subject matter. To the contrary, this Summary merely outlines various concepts and features that are developed in the Detailed Description.

BRIEF DESCRIPTION OF THE DRAWINGS

To fully understand the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
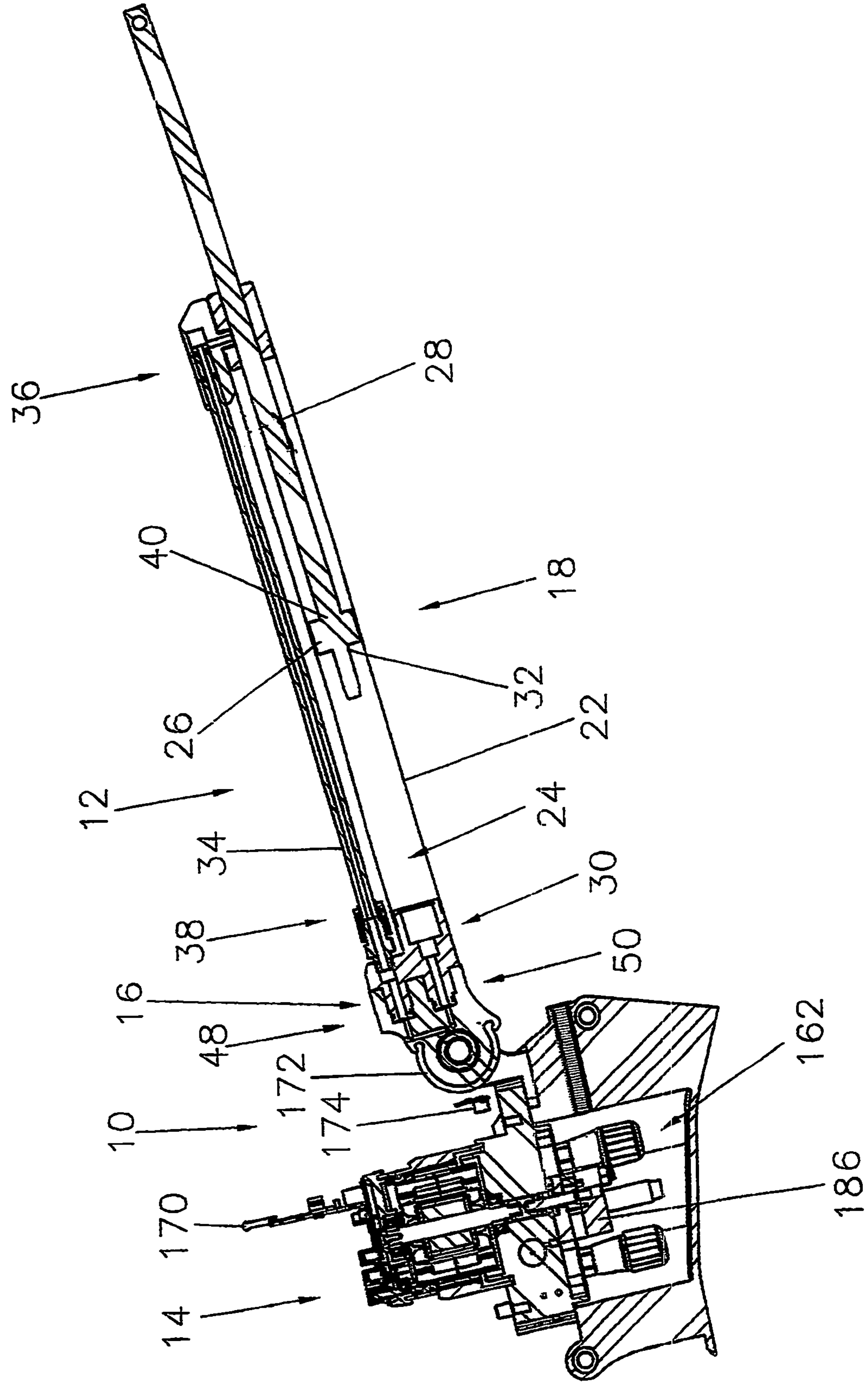
FIG. 1 is a cross-sectional side view of the fluid flow control system of the present invention.

As shown in FIG. 1, the present invention relates to a fluid flow control system generally indicated as 10 to control the movement of a work implement such as a shallow water anchor (not shown) between a first or stowed position and a second or deployed position.

As shown in FIG. 1, the fluid flow control system 10 comprises an actuator assembly generally indicated as 12 and a pump assembly generally indicated as 14 coupled together by a modular fluid distribution assembly generally indicated as 16.

As shown in FIG. 1, the actuator assembly 12 comprises a hydraulic actuator generally indicated as 18 comprising an elongated cylinder 22 including a fluid chamber 24 having a piston 26 including a proximal surface 32 and a distal surface 40, and actuator rod 28 combination disposed therein coupled to the modular fluid distribution assembly 16 by a mount or fitting generally indicated as 30 at the base or proximal end portion of the elongated cylinder 22 to pump fluid from the pump assembly 14 through a first fluid flow path formed in the modular fluid distribution assembly 16 to move the work element (not shown) from the first position to the second position.

As shown in FIG. 1, a substantially straight conduit 34 is coupled to the distal end of the elongated cylinder 22 by a distal fluid fitting generally indicated as 36 and to the modular fluid distribution assembly 16 by a proximal fluid fitting generally indicated as 38 to pump fluid from the pump assembly 14 through a second fluid flow path formed in the modular fluid distribution assembly 16 to move the work element (not shown) from the second position to the first position. The substantially straight conduit 34 is disposed in substantially parallel relationship relative to the elongated cylinder 22.

Figure 2:
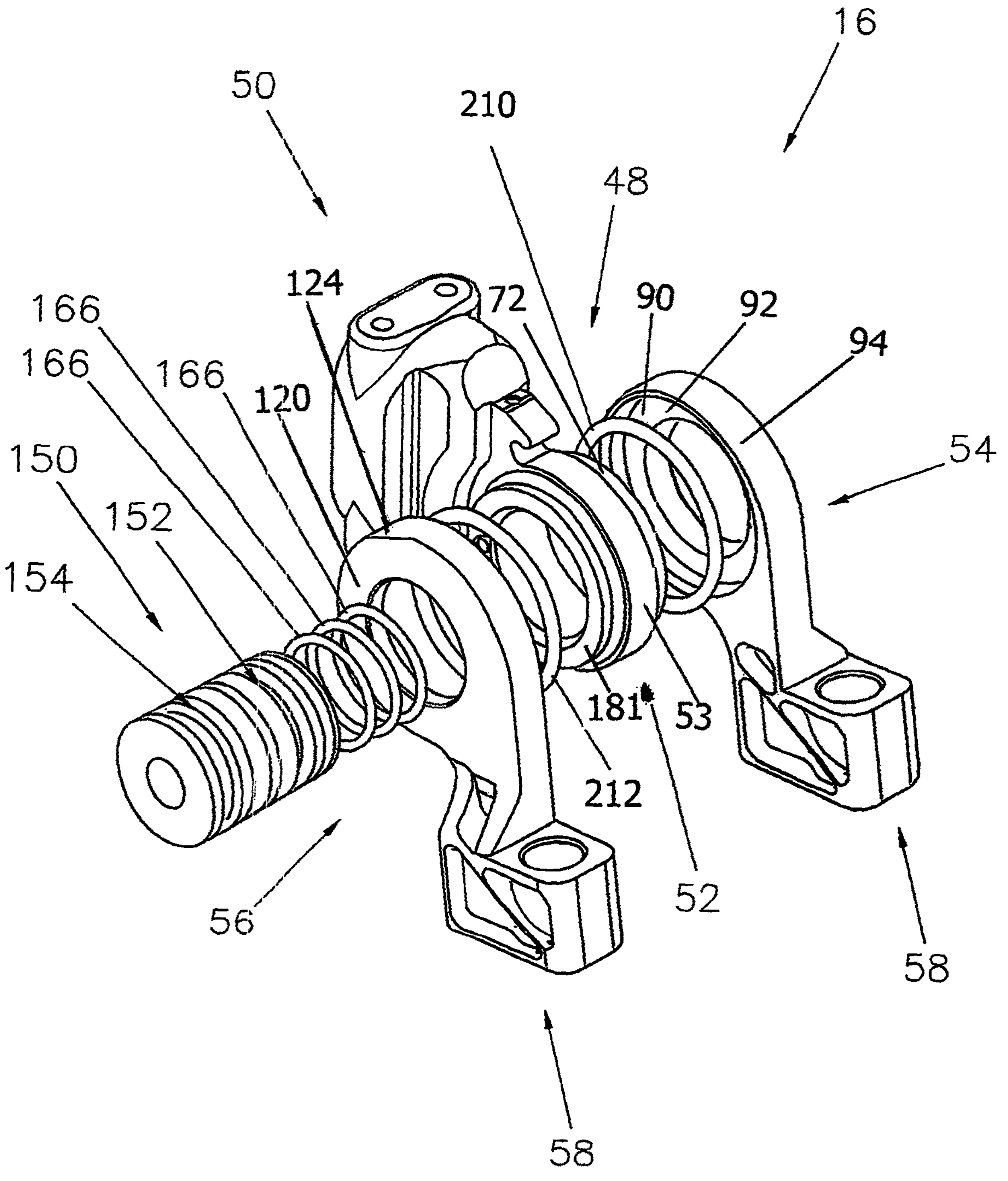
FIG. 2 is an exploded view of the modular fluid distribution assembly of the present invention.

As shown in FIG. 2, the modular fluid distribution assembly 16 comprises a fluid manifold generally indicated as 48 including a distal manifold member generally indicated as 50 affixed to the actuator assembly 12 and a proximal manifold member generally indicated as 52, and a substantially cylindrical interior fluid transfer member 150 disposed between a first fluid flow member generally indicated as 54 and a second fluid flow member generally indicated as 56. The first fluid flow member 54 and second fluid flow member 56 are each connected to the pump assembly 14 by a corresponding distal coupler or mount generally indicated as 58.

Figure 5:
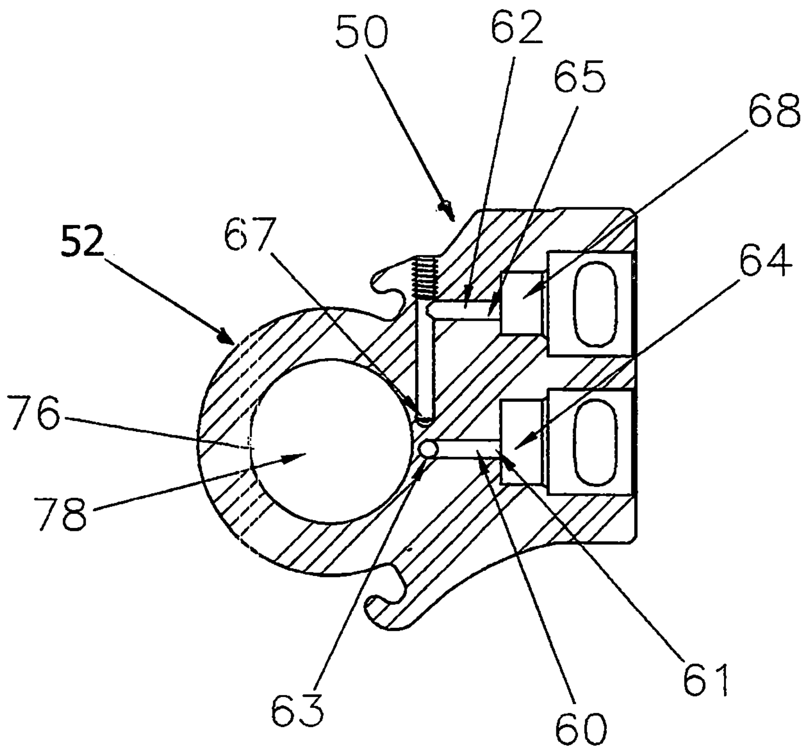
FIG. 5 is a cross-sectional side view of the distal manifold member of the present invention.

As shown in FIG. 5, a first distal fluid passage 60 extending between a first distal port 61 and a first proximal port 63 and a second distal fluid passage 62 extending between a second distal port 65 and a second proximal port 67 are formed in the interior of the distal manifold member 50. A first seat or chamber 64 and a second seat or chamber 68 are formed in the interior of the distal manifold member 50 to receive the corresponding fluid fitting 38 to couple the elongated cylinder 22 and the substantially straight conduit 34 to the distal manifold member 50 of the fluid manifold 48 of the modular fluid distribution assembly 16 respectively.

Figure 3:
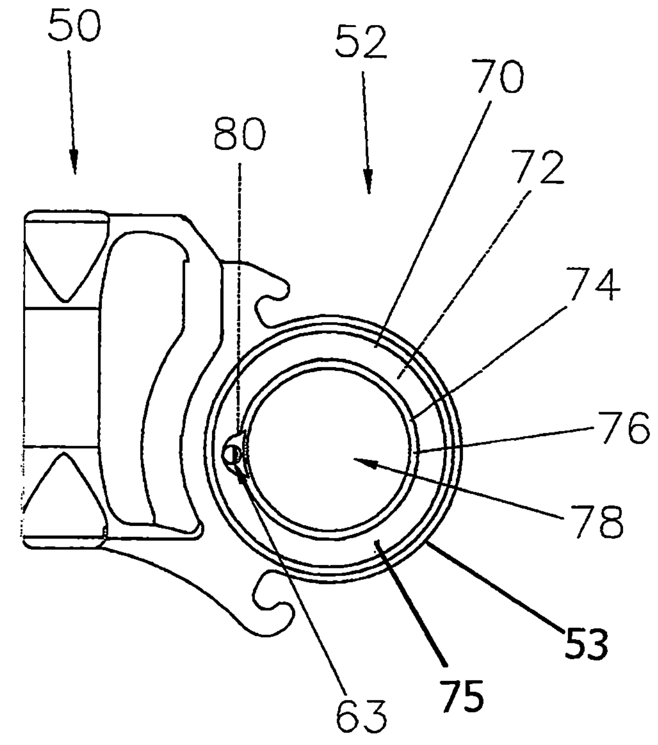
FIG. 3 is a side view of the distal manifold member of the present invention.
Figure 4:
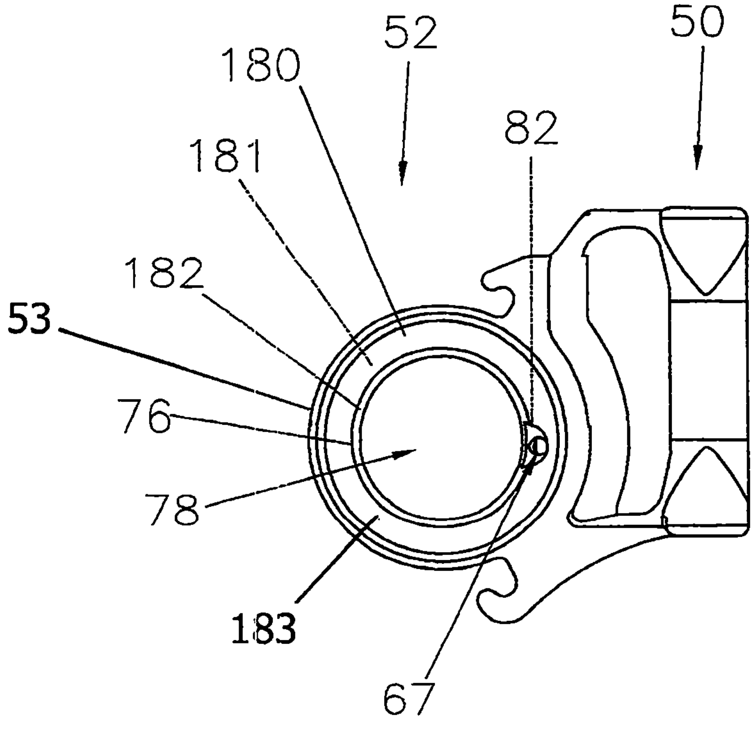
FIG. 4 is a side view of the opposite side of the distal manifold member of the present invention.

As shown in FIGS. 3 and 4, the proximal fluid manifold member 52 comprises an inner ring 70 and an inner ring 180 formed on opposite sides of the outer substantially circular ring 53. Inner ring 70 and inner ring 180 include raised substantially circular ridges or rims 72 and 181 respectively having outer surfaces 75 and 183 respectively. Beveled surfaces 74 and 182 are formed between the outer surfaces 75 and 183 of the raised circular ridges or rims 72 and 181 formed on inner rings 70 and 180 respectively and opposite sides of an inner surface 76 of a central substantially circular opening or hole 78 formed in the proximal fluid manifold member 52.

As shown in FIG. 3, the first proximal port 63 of the first distal passage is disposed in a recess or pocket 80 formed on the outer surface 75 of the raised substantially circular ridge or rim 72 of the inner ring 70 at or on the beveled surface 74.

As shown in FIG. 4, the second proximal port 67 of the second distal passage 62 is disposed in a recess or pocket 82 formed on the outer surface 183 of the raised substantially circular ridge or rim 181 of the inner ring 182 at or on the beveled surface 182.

Figure 6:
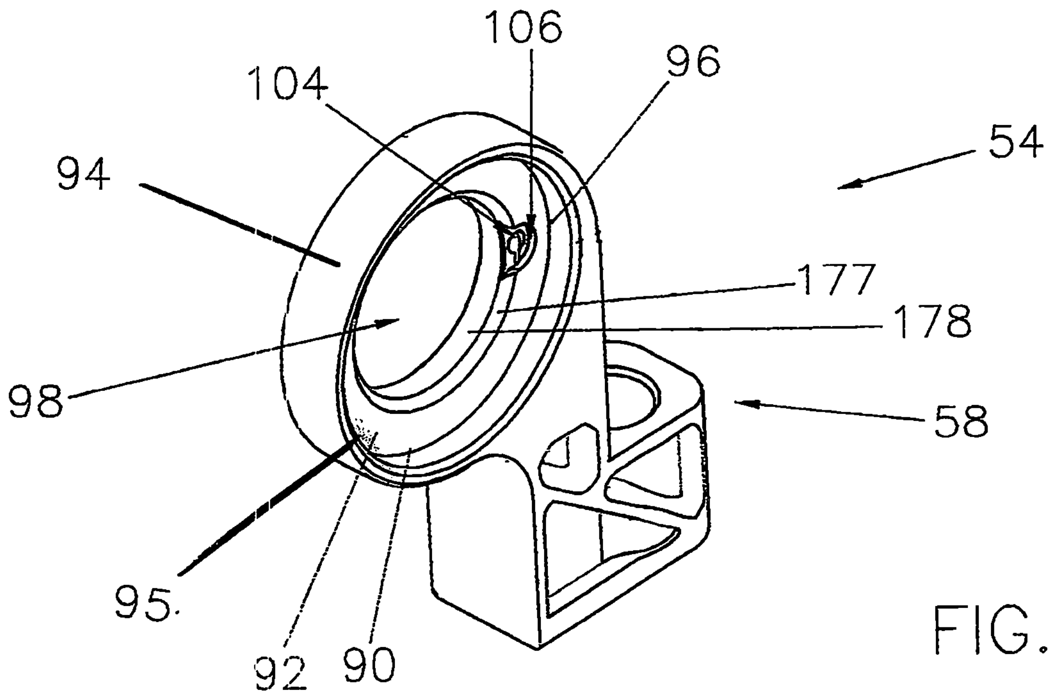
FIG. 6 is an isometric view of the first fluid flow member of the present invention.

As shown in FIG. 6, the first fluid flow member 54 comprises an outer ring 90 having an inner surface 92 and a substantially circular collar 94 terminating in a circular edge 95 and having an inner surface 96 extending inwardly from the outer periphery of the outer ring 90. A substantially circular central opening or hole 98 including an interior surface 178 is formed through the outer ring 90. The first fluid flow member 54 is coupled to the pump assembly 14 by the corresponding distal coupler or mount 58.

Figure 7:
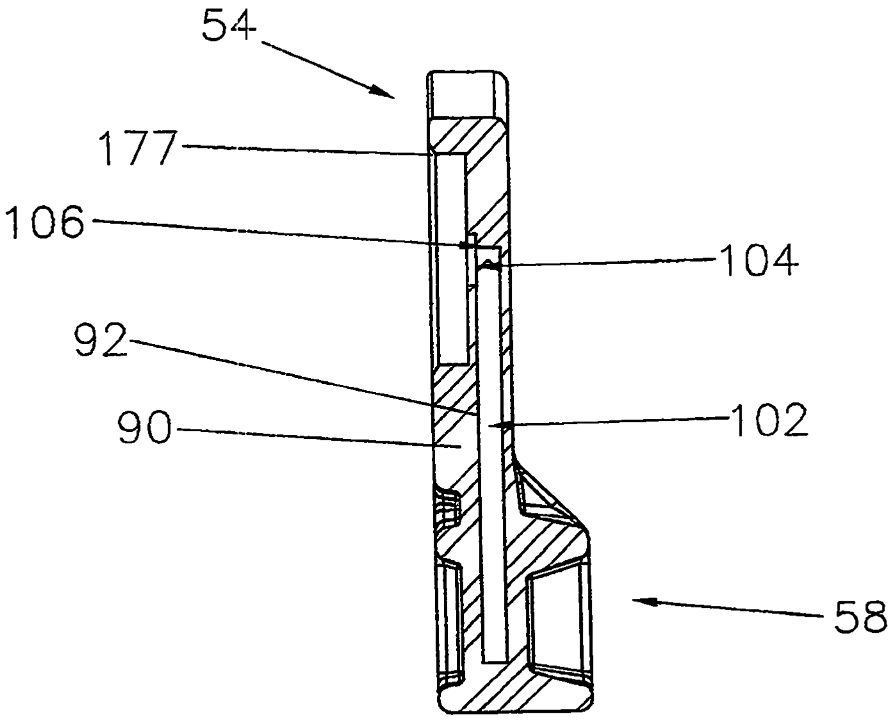
FIG. 7 is a cross-sectional end view of the first fluid flow member of the present invention.

As shown in FIG. 7, the first fluid flow member 54 also includes a first distal fluid flow passage generally indicated as 102 having a first proximal port 104 disposed in a recess or pocket 106 formed in the inner surface 92 of the outer ring 90 at the proximal end of the first proximal fluid flow passage 102.

Figure 8:
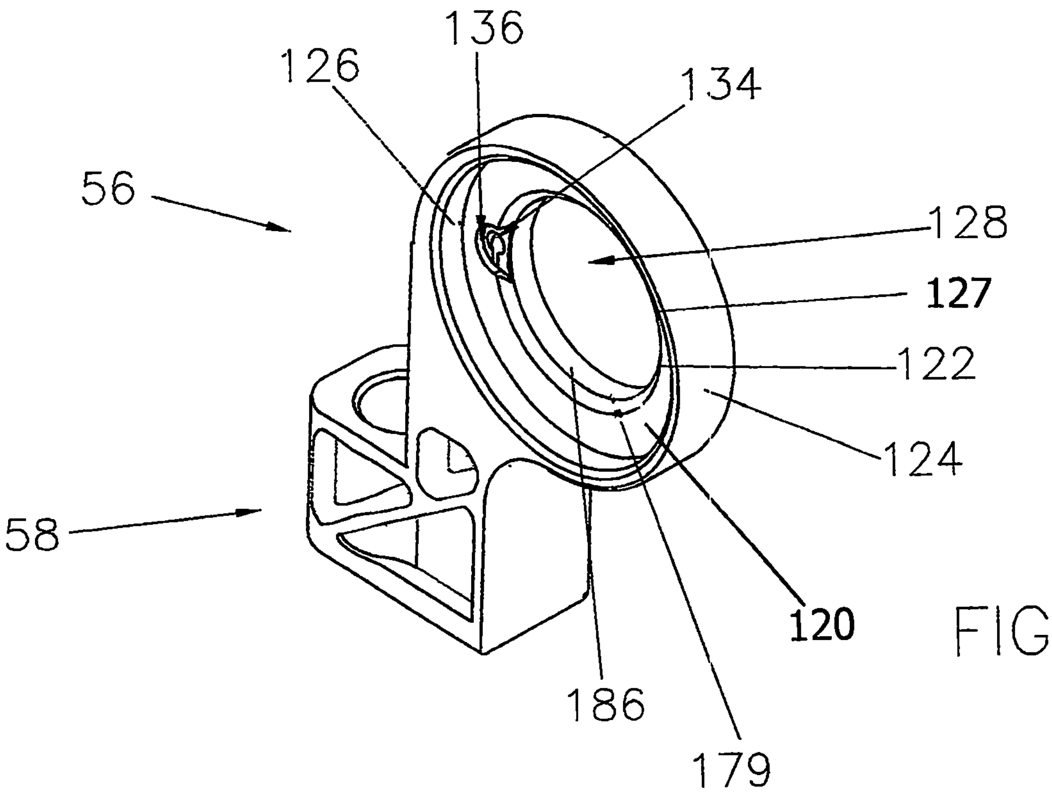
FIG. 8 is an isometric side view of the second fluid flow member of the present invention.

As shown in FIG. 8, the second fluid flow member 56 comprises an outer ring 120 having an inner surface 122 and a substantially circular collar 124 terminating in a circular edge 127 and having an interior surface 126 extending inwardly from the other periphery of the outer ring 120. A substantially circular central opening or hole 128 including an inner surface 186 is formed through the outer ring 120. The second fluid flow member 56 is coupled to the pump assembly 14 by the corresponding distal coupler or mount 58.

Figure 9:
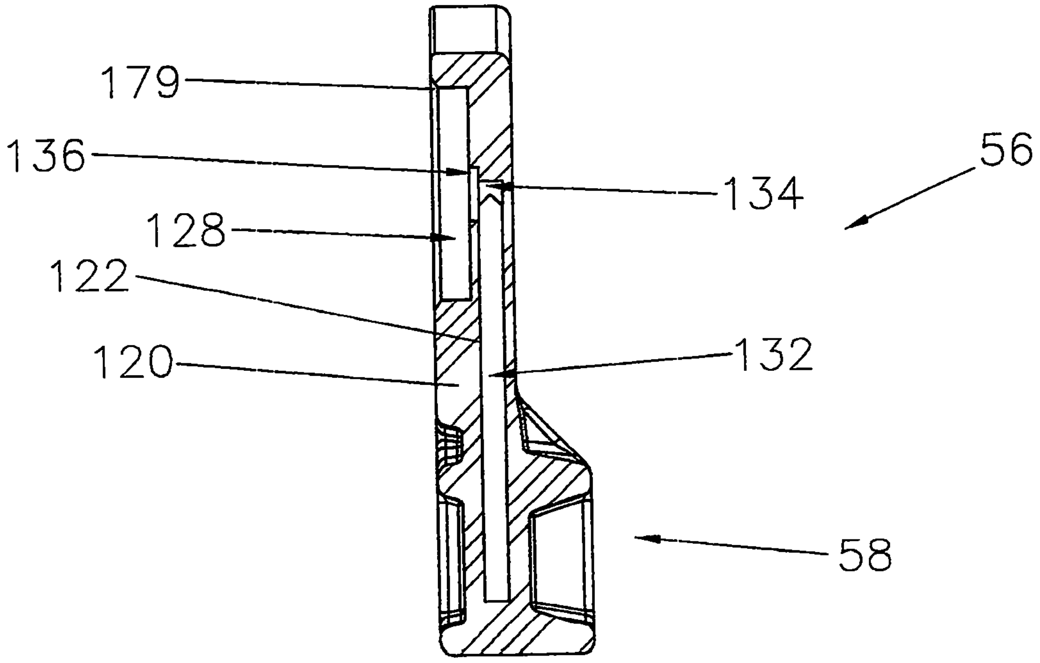
FIG. 9 is a cross-sectional view of the second fluid flow member of the present invention.

As shown in FIG. 9, the second fluid flow member 56 also includes a second distal flow passage generally indicated as 132 having a second distal port 134 disposed in a recess or pocket 136 formed in the inner surface 122 of the outer ring 120 at the proximal end of the second proximal fluid flow passage 132.

Figure 10:
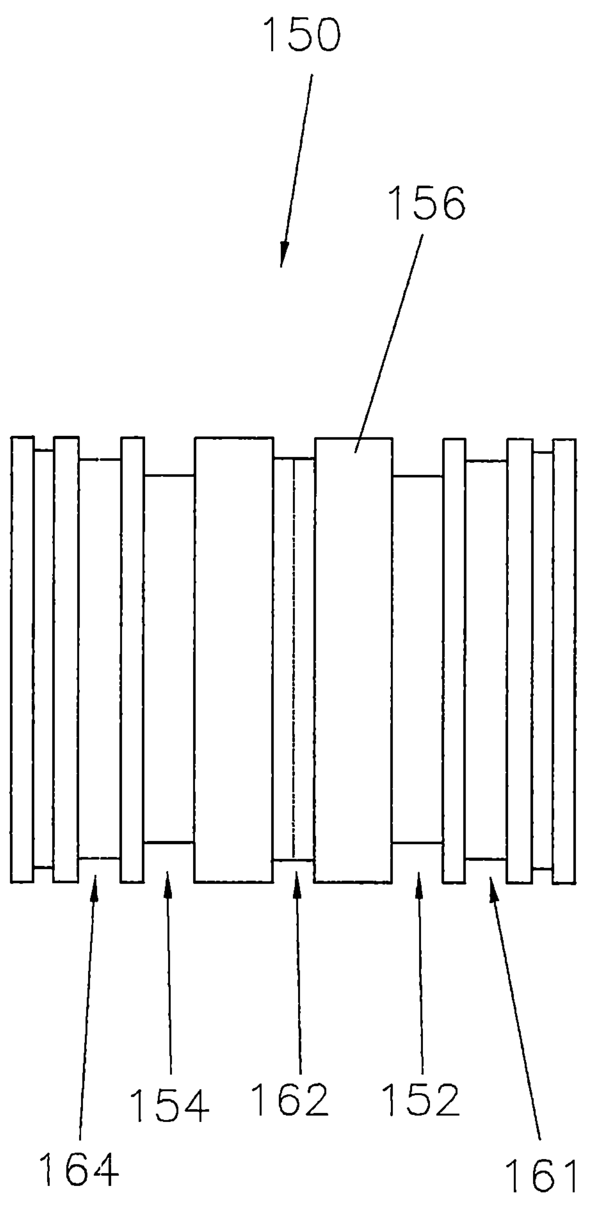
FIG. 10 is a side view of the interior fluid transfer member of the present invention.
Figure 11:
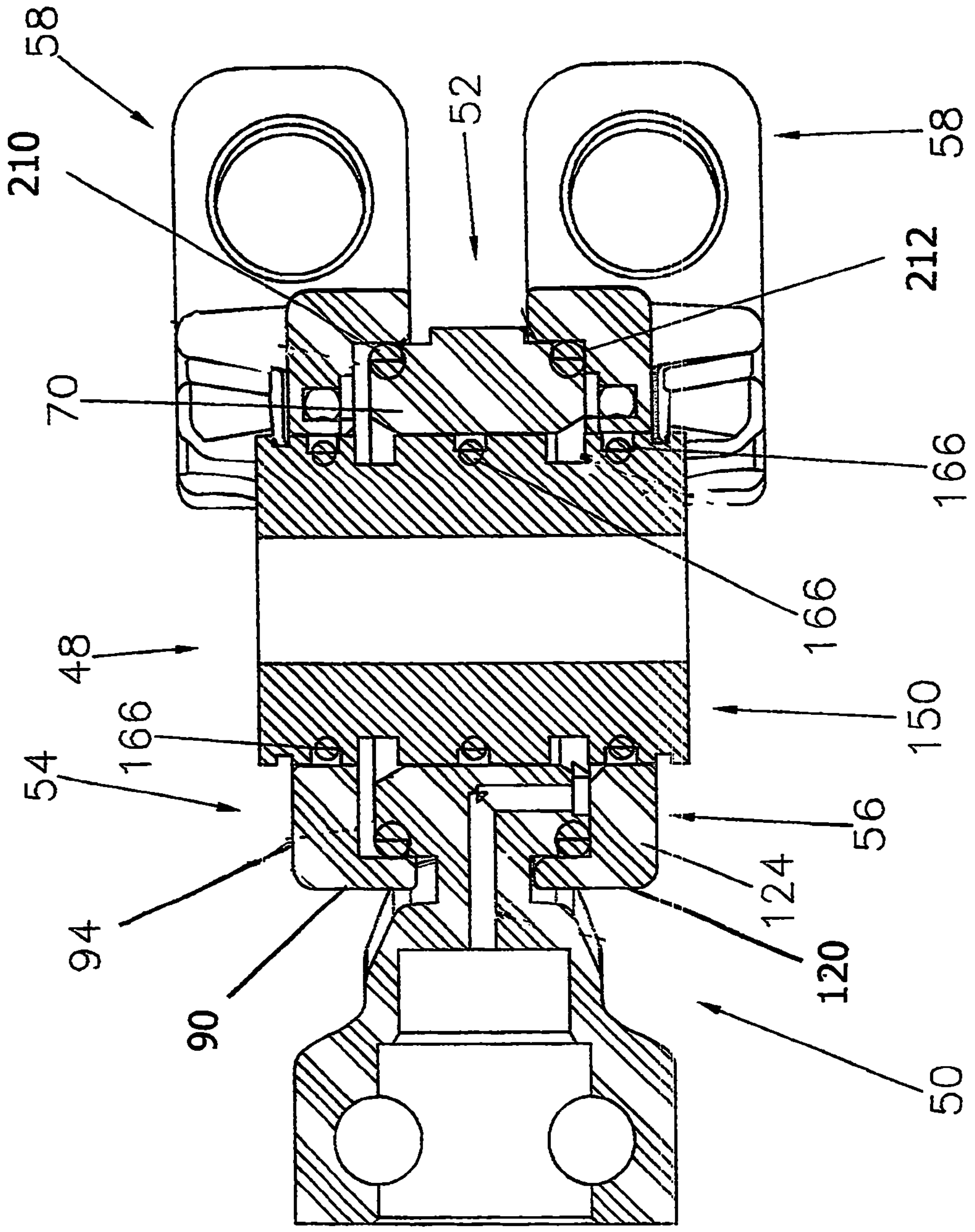
FIG. 11 is a cross-sectional view of the modular fluid distribution assembly of the present invention.

As shown in FIGS. 2, 10 and 11, the substantially cylindrical interior fluid transfer member 150 includes a first inner fluid flow groove 152 and a second inner fluid flow groove 154 formed on the outer surface 156 thereof.

In addition, a first groove 161 and a second groove 162 are formed on the outer surface 156 of the substantially cylindrical interior fluid transfer member 150 each to receive a corresponding O-ring 166 disposed to engage the interior surface 178 of the substantially circular opening or hole 98 of the outer ring 90 of the first fluid flow member 54 and the inner surface 76 of the substantially circular opening or hole 78 formed in the proximal fluid manifold member 52 respectively. A third groove 164 is formed on the outer surface 156 of the substantially circular interior fluid transfer member 150 to receive a corresponding O-ring 166 disposed to engage the interior surface 186 of the substantially circular central opening or hole 128 of the outer ring 120 of the second fluid flow member 56.

When the fluid manifold 48, substantially cylindrical interior fluid transfer member 150 and fluid flow members 54 and 56 of the modular fluid distribution assembly 16 are assembled, the outer edge 95 of the substantially circular collar 94 of the first fluid flow member 54 engages a first side of the outer substantially circular ring 53 of the proximal fluid manifold member 52 forming a space or gap between the inner surface 92 of the outer ring 90 of the first fluid flow member 54 and the outer surface 75 of the raised substantially circular ridge or rim 72 that is substantially aligned with the first inner fluid flow groove 152 of the substantially cylindrical interior fluid transfer member 150 to form a first fluid flow channel 158 and the outer edge 127 of the substantially circular collar 124 of the second fluid flow member 56 engages a second side of the outer substantially circular ring 53 opposite the first side of the proximal fluid flow member 52 forming a space or gap between the inner surface 122 of the outer ring 120 of the second fluid flow member 56 and the outer surface 183 of the raised substantially circular ridge or rim 181 that is substantially aligned with the second inner fluid flow groove 154 of the substantially cylindrical interior fluid transfer member 150 to form a second fluid flow channel 160.

O-ring 210 is disposed between inner surface 92 of outer ring 90 of the first fluid flow member 54 and the outer periphery 71 of the inner ring 70 of the proximal manifold member 52.

O-ring 212 is disposed between the inner surface 122 of the outer ring 120 of the second fluid flow member 56 and the outer periphery 184 of the inner ring 180 of the manifold member 52.

O-rings disposed in groove 161, groove 162 and O-ring 210 cooperatively seal the first fluid flow channel 158; while, O-rings disposed in groove 164, groove 162 and the O-ring 212 cooperatively seal the second fluid flow channel 160.

When assembled, the hydraulic actuator 16 and distal manifold member 50 are rotationally coupled to the pump assembly 14 by the proximal manifold member 52, first fluid flow member 54 and second fluid flow member 56.

As shown in FIG. 1, the pump assembly 14 comprises a reversible pump 186 disposed within a fluid reservoir 162 to pump fluid to and from the actuator assembly 12 through the modular fluid distribution assembly 16. Operation of the pump assembly 14 is controlled by a microcontroller 170 including logic and circuitry to control the operation of the modular fluid flow control system 10 coupled to a control panel (not shown) or a wireless device (not shown).

When fully assembled, the first distal fluid flow passage 102 of the first fluid flow member 54, first fluid flow channel 158 of the substantially cylindrical interior fluid transfer member 150 and first distal fluid passage 60 of the distal manifold mount 50 cooperatively form the first fluid flow path to transfer fluid between the actuator extension subassembly 18 of the actuator assembly 12 and the pump assembly 14; while, the second distal fluid flow passage 132 of the second fluid flow member 56, second fluid flow channel 160 of the substantially cylindrical interior fluid transfer member 150 and second distal fluid passage 62 of the distal manifold mount 50 cooperatively form the second fluid flow path to transfer fluid between the actuator retraction subassembly 20 of the actuator assembly 12 and the pump assembly 14.

Thus, the pump 186 of the pump assembly 14 pumps fluid from the fluid reservoir 162 to either side of the actuator assembly 12 through the first fluid flow path to move the work element (not shown) attached to the distal end of the actuator rod 28 (not shown) from the first position to the second position or vice versa.

As the work element (not shown) moves between the first position and the second position the distal manifold member 50 and proximal manifold member 52 rotate together with the actuator assembly 12, the angle between the work element (not shown) and the fluid flow member 54 and 56 changes. Thus, the fluid flow control system 10 may also include a position sensing feature to indicate the position of the actuator assembly 12. The position sensing feature may comprise a first sensing element such as a magnet 172 mounted on the distal manifold member 50 of the manifold or distribution assembly 16 and a second sensing element or stationary sensor such as an encoder 174 coupled to the microprocessor 170 to generate a position signal in response to the position of the actuator assembly 12 and work piece (not shown) disposed to sense the relative position of the actuator assembly 12 and generate a signal fed to the microprocessor 170.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

What is claimed is:

1. A fluid flow control system to control the movement of a work element between a first position and second position, said fluid flow control system comprises an actuator assembly and pump assembly coupled together by a modular fluid distribution assembly mounted axially at a load bearing pivot point, said modular fluid flow distribution assembly includes a first fluid flow path and a second fluid flow path to selectively move the work element between the first position and second position, said actuator assembly comprises an actuator extension subassembly and an actuator retraction subassembly, said actuator extension subassembly comprises an elongated cylinder coupled to said modular fluid distribution assembly to facilitate the flow of fluid to and from said pump assembly through said first fluid flow path formed in said modular fluid distribution assembly and said actuator retraction subassembly comprises a substantially straight conduit coupled between said elongated cylinder and said modular fluid distribution assembly to facilitate flow of fluid to and from said assembly through said second fluid flow path formed in said modular fluid distribution assembly.

2. The fluid flow control system of claim 1 wherein said modular fluid distribution assembly comprises a distal manifold member including an interior coupled to said actuator assembly disposed between a first fluid flow member and a second fluid flow member are coupled to said pump assembly to circulate fluid to and from the work element.

3. The fluid flow control system of claim 2 wherein a first fluid passage and a second fluid passage are formed in the interior of said distal manifold member, said first fluid flow member includes a first flow passage formed therein and said second fluid flow member includes a second flow passage formed therein to circulate fluid to and from the work element.

4. The fluid flow control system of claim 3 further including an interior fluid transfer member having a first fluid flow groove and a second fluid flow groove formed thereon align with said first fluid flow member and said second fluid flow member responding to form a first fluid flow channel and a second fluid flow channel respectively in fluid communication with said first fluid passage and said first flow passage and said second fluid passage and said second flow passage respectively.

5. The fluid flow control system of claim 4 wherein said first fluid flow passage of said first fluid flow member, said first fluid flow channel in said interior fluid transfer member and said first flow passage of said first fluid flow member cooperatively form said first fluid flow path to transfer fluid between said actuator extension subassembly of said actuator assembly and said pump assembly and said second fluid flow passage of said second fluid flow member, said second fluid flow path to transfer fluid between said actuator retraction subassembly of said actuator assembly and said pump assembly.

6. The fluid flow control system of claim 2 wherein said first fluid flow member and said second fluid flow member are rotatably mounted to said distal manifold member.

* * * * *